(No Model.)
P. B. SHELDON.
COFFEE ROASTER AND CORN POPPER.
No. 289,312. Patented Nov. 27, 1883.
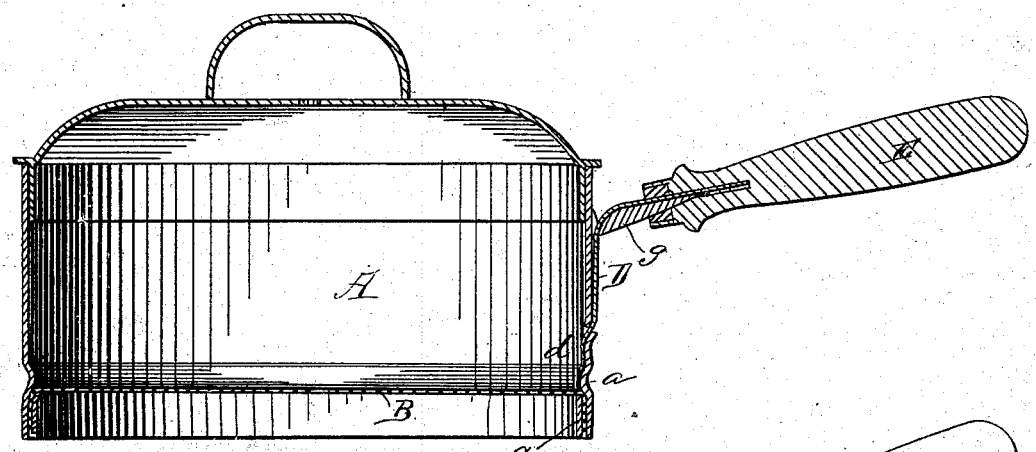
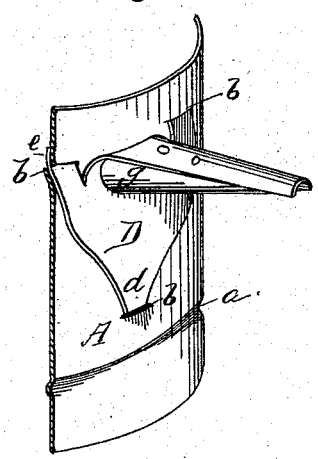
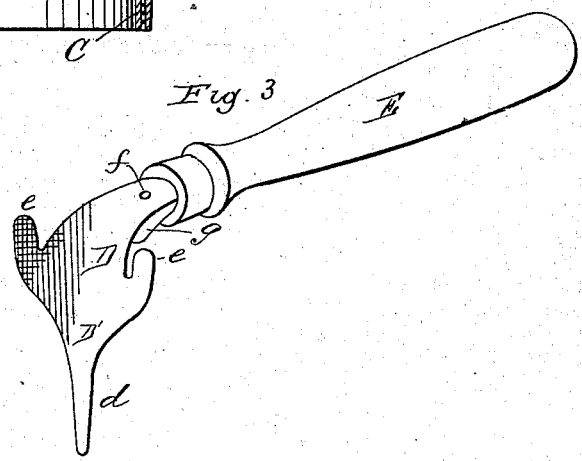
Witnesses:
E. W. Johnson
H. W. Taylor
Inventor
Philo B. Sheldon
Attorney

United States Patent Office.

PHILO B. SHELDON, OF ERIE, PENNSYLVANIA.

COFFEE-ROASTER AND CORN-POPPER.

SPECIFICATION forming part of Letters Patent No. 289,312, dated November 27, 1883.

Application filed March 29, 1883. (No model.)

*To all whom it may concern:*

Be it known that I, PHILO B. SHELDON, a citizen of the United States of America, residing at Erie, in the county of Erie and State of Pennsylvania, have invented certain new and useful Improvements in Coffee-Roasters and Corn-Poppers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in corn-poppers, coffee-roasters, and similar kitchen implements; and it consists in the construction of the roaster and handle, as will be hereinafter fully set forth, and pointed out in the claims.

The object of my invention is to provide a simple and effective handle for sheet-metal implements; also, to provide a corn-popper or coffee-roaster the sides and top of which will be closed to prevent the escape of heat, with an open bottom, the same being held at a distance above the bottom of the sides, so as to prevent the article being cooked from coming in direct contact with the top of the stove.

In the annexed drawings, which illustrate my invention, Figure 1 is a vertical longitudinal section taken through the handle and body of the implement. Fig. 2 is a detailed view, partly in section. Fig. 3 is a perspective view of the handle detached.

In the annexed drawings, A represents the body of the utensil, which is preferably made of sheet metal, and is provided near its lower edge with a groove, $a$. The ends of this sheet-metal band or side are united by rivets.

The bottom B, which consists of wire fabric, is first cut in a circular form, the rim being bent at right angles. This bottom B is secured within the base of the receptacle A, adjacent to the groove $a$, by a band, C, which serves to hold the parts securely together.

When the parts are put together, as shown in the annexed drawings, the wire-gauze bottom will be located at a considerable distance above the lower rim of the side, and will prevent the grains, when being roasted or cooked, from coming in contact with the top of the stove when the same is placed thereon. This vessel is provided with a top of ordinary construction, having a handle and perforations under said handle. The side of the receptacle A is provided with openings $b\ b\ b$, which openings consist of slits which are horizontal to the top and bottom edge of the side. The upper openings are indented at their lower edges, while the lower opening is similarly indented at its upper edges, for the reception of tongues, which are formed on the plate D of the handle, as will hereinafter be set forth. The handle E is of ordinary construction, and is provided at its end with an opening and ferrule, the opening circular in form and of the general shape of those usually supplied to the trade. The plate D, which forms the connecting means between the handle E and sides of the receptacle A, consists of a single piece of sheet metal, the lower portion, D', of which is substantially triangular in shape, the whole being cruciform. The lower portion of this plate D' is provided with a tongue, $d$, which projects downwardly, and on its side it is provided with upwardly-projecting tongues $e\ e$, which are located on the upper side or reversed base of the triangle. The remaining portion of this plate D tapers from the upper part of the aforesaid triangle downwardly, the same being formed of a single piece. To this portion of the plate D is attached, by means of rivets $f\ f$, a block, $g$, of the shape shown, and the end or tang is bent over said block, so as to be substantially circular in cross-sections. This upper portion or tang is then bent outwardly from the plate D, as shown. To attach the holder to the vessel A, the lower tongue is inserted in the opening adjacent to the groove on the vessel A, and it is passed through the same until the upper tongues are on a line with the upper perforations, which are inserted therein. The plate D is then pushed slightly upward, which brings the tongue in contact with the edges of the upper perforations. The lower tongue is then pressed over the bead or groove, thus securing the parts firmly to each other. The handle E is then attached to the tang in the usual manner.

Having thus described my invention, what I claim as new, and desire to secure by Letters Patent, is—

1. The improved corn-popper and coffee-roaster herein described, consisting of the side A, provided with inwardly-depressed bead $a$, wire bottom with downwardly-projecting sides and band, substantially as described, and for the purpose set forth.

2. In combination with the body A, having perforations $b\ b\ b$, the plate D, having projecting tongues $d\ e\ e$, and tang, bent substantially as shown, and provided with the block $g$, for the purpose set forth.

In testimony whereof I affix my signature in presence of two witnesses.

PHILO B. SHELDON.

Witnesses:
C. SWALLEY,
H. C. SMITH.